United States Patent [19]

Fryer et al.

[11] 3,868,362
[45] Feb. 25, 1975

[54] OXAZOLOBENZODIAZEPINES
[75] Inventors: Rodney Ian Fryer, North Caldwell; Armin Walser, West Caldwell, both of N.J.
[73] Assignee: Hoffmann-LaRoche Inc., Nutley, N.J.
[22] Filed: Nov. 29, 1973
[21] Appl. No.: 420,119

[52] U.S. Cl. .......................... 260/239.3 T, 424/274
[51] Int. Cl. ...................... C07d 85/48, C07d 53/06
[58] Field of Search ............................ 260/239.3 T

[56] References Cited
UNITED STATES PATENTS
3,755,300  8/1973  Tachikawa et al. .......... 270/239.3 T Primary Examiner—Henry R. Jiles
Assistant Examiner—Robert T. Bond
Attorney, Agent, or Firm—Samuel L. Welt; Jon S. Saxe; William G. Isgro

[57] ABSTRACT

Novel oxazolobenzodiazepines bearing a hydroxyamino group in the 7-position of the basic benzodiazepine moiety are disclosed. These compounds are prepared by the selective reduction of the corresponding 7-nitrooxazolobenzodiazepine. The novel end products are useful as sedative, muscle relaxant and anticonvulsant agents.

2 Claims, No Drawings

OXAZOLOBENZODIAZEPINES

DETAILED DESCRIPTION OF THE INVENTION

The present invention relates to novel 1,4-benzodiazepine derivatives. More particularly, this invention is concerned with 1,4-benzodiazepines bearing an oxazole ring between positions 4- and 5- and a hydroxyamino group in position 7 of the basic benzodiazepine moiety. These novel compounds are useful as sedatives, muscle relaxant and anti-convulsant agents.

The compounds of the present invention are selected from the group consisting of compounds of the formula

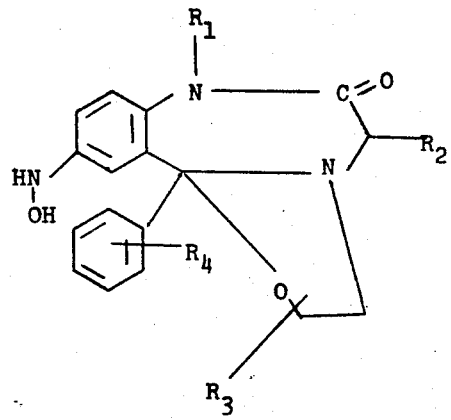

wherein
$R_1$ signifies hydrogen, lower alkyl, cycloalkyl-lower alkyl, lower alkoxy-lower alkyl, hydroxy-lower alkyl, or di-lower alkylamino-lower alkyl;
$R_2$ signifies hydrogen or lower alkyl,
$R_3$ signifies hydrogen or lower alkyl;
$R_4$ signifies hydrogen or halogen
and the pharmaceutically acceptable acid addition salts thereof.

As used herein, the term "lower alkyl", either alone or in combination comprehends straight or branched chain hydrocarbon groups having from 1-7 carbon atoms, preferably 1-4 carbon atoms, such as methyl, ethyl, propyl, isopropyl and the like. The term "cycloalkyl-lower alkyl" encompasses hydrocarbon groups having 4-10 carbon atoms such as cyclopropylmethyl, cyclobutylmethyl, cyclopropylethyl and the like. The term "lower alkoxy" comprehends an O-lower alkyl group such as methoxy, ethoxy, propoxy and the like. The term "halogen" represents all four forms thereof, i.e. fluorine, chlorine, bromine and iodine, unless expressly indicated otherwise.

A preferred group of compounds falling within the scope of formula I are those wherein $R_1$ signifies lower alkyl or lower alkoxy-lower alkyl, and $R_2$ and $R_3$ are hydrogen, i.e. compounds of the formula

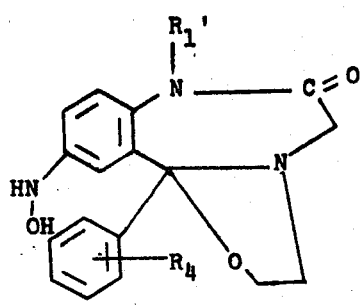

wherein $R_1'$ is lower alkyl or lower alkoxy-lower alkyl and $R_4$ is as described above
and the pharmaceutically acceptable acid addition salts thereof.

When the $R_4$ substituent is halogen, this group is preferably chlorine or fluorine and is located in the ortho position of the phenyl ring. When the $R_1$ substituent is lower alkyl, methyl is preferred whereas if $R_1$ is lower alkoxy-lower alkyl, methoxymethyl is preferred.

The compounds of formula I above are prepared by the selective reduction of the corresponding 7-nitro-oxazolobenzodiazepine of the formula

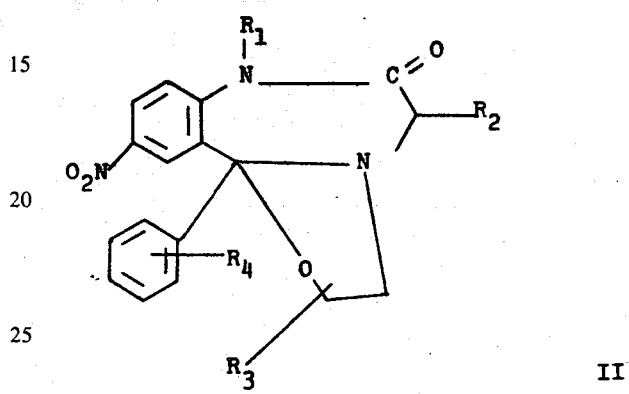

wherein $R_1$–$R_4$ are as described above.

The reduction of the 7-nitro group to the desired hydroxyamino group is accomplished by selective chemical or catalytic reducing systems. Suitable reducing systems for the present purposes include zinc in ammonium chloride and stannous chloride in a buffered system. Acetate, citrate or phosphate buffers are suitable with sodium acetate being preferred. This reduction is preferably effected in the presence of an inert organic solvent. Representative of the solvents that can be employed are alcohols such as methanol, ethanol and the like, water, ethers such as tetrahydrofuran, hydrocarbons such as hexane and the like, chlorinated hydrocarbons such as chloroform, methylene chloride and the like, acetone, dimethylformamide and dimethylsulfoxide. Temperature is not critical to this process aspect so that temperature above or below room temperature can be employed with room temperature being preferred.

The starting materials of formula II above may be prepared, for example, by reacting a 4,5-unsaturated 1,4-benzodiazepine of the formula

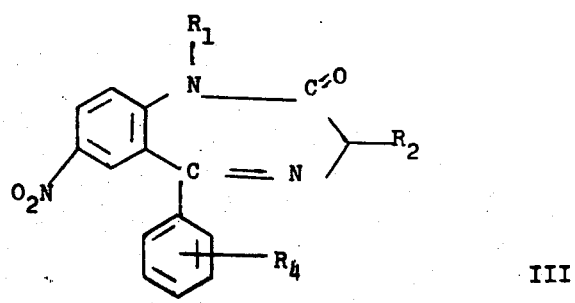

wherein $R_1$, $R_2$, and $R_4$ are as described above with an epoxide compound of the formula

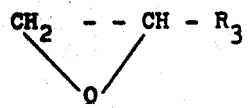

wherein $R_3$ is as described above in the presence of an acidic agent such as, for example, an aprotic acid, e.g., aluminum chloride, ferric chloride, zinc chloride, titanium tetrachloride, boron trifluoride, stannic chloride, etc., or p-toluene sulfonic acid, benzene sulfonic acid, and the like. The most preferred acidic agents for this purpose are aluminum chloride and stannic chloride. Examples of compounds of formula IV useful in this invention include ethylene oxide, propylene oxide and the like.

The reaction between the compounds of formulae III and IV is conveniently conducted in the presence of an anhydrous inert organic solvent. Suitable solvents include aromatic hydrocarbons such as benzene, toluene, xylene, etc., halogenated hydrocarbons such as ethylene dichloride, ethers such as tetrahydrofuran and diethyl ether, and carbon disulfide. This reaction may be carried out at a temperature in the range of from about $-10°$ to the reflux temperature of the reaction medium, most preferably from $10°$ to reflux.

In a further process aspect of the present invention, a lower alkyl, hydroxy-lower alkyl, cycloalkyl-lower alkyl, lower alkoxy-lower alkyl or di-lower alkylamino-lower alkyl group can be introduced as the $R_1$ substituent into a compound of formulae I or II above wherein $R_1$ is hydrogen by reacting said compound with a suitable alkylating agent. This alkylation is expediently effected by first preparing the N-sodio derivative of the 1-unsubstituted compound and without isolation reacting said N-sodio derivative with a suitable alkylating agent. Alkylating agents that can be used for the present purposes include alkyl halides, halo-lower alkanols, halo-di lower alkyl ethers and di lower alkylamino alkyl halides. Representative of such alkylating agents are 2-bromoethanol, chlorodimethylether, methyl iodide, cyclopropylmethyl chloride and (2-bromoethyl)-diethylamine.

The N-sodio derivative of the 1-unsubstituted compound can be prepared by treating said compound with a sodium lower alkoxide such as sodium methoxide or with sodium hydride. This reaction is expediently effected in the presence of an inert organic solvent such as dimethylformamide and aromatic hydrocarbons, i.e. benzene, toluene and the like. Temperatures above and below room temperature may be employed, with temperatures from $-20°$ to room temperature preferred.

The compounds of formula I above form pharmaceutically acceptable acid addition salts with organic and inorganic acids. Thus the compounds of the present invention form pharmaceutically acceptable acid addition salts with inorganic acids such as the hydrohalic acids, for example hydrochloric acid and hydrobromic acid, and with organic acids such as tartaric acid, citric acid, camphor sulfonic acid, ethane sulfonic acid, toluene sulfonic acid, salicylic acid, ascorbic acid, maleic acid, succinic acid, formic acid, acetic acid and the like.

The compounds of formula I above as well as their pharmaceutically acceptable acid addition salts are useful as anti-convulsant, muscle relaxant and sedative agents. Thus, the compounds of the present invention and their pharmaceutically acceptable salts can be used as medicaments. For example, they can be used in the form of pharmaceutical preparations which contain them or their salts in ad-mixture with a pharmaceutical organic or inorganic carrier material which is suitable for enteral or parenteral application such as, for example, water, gelatin, lactose, starches, magnesium sterate, talc, vegetable oils, gum arabic, polyalkyleneglycols, vaseline, etc. The pharmaceutical preparation can be prepared in solid form (e.g. as tablets, dragees, suppositories, capsules) or in liquid form (e.g. as solutions, suspensions or emulsions). They may be sterilized and/or contain additives such as preserving, stabilizing, wetting or emulsifying agents, salts for varying the osmotic pressure or buffers. They can also contain other therapeutically valuable substances.

The compounds of formula I above or their pharmaceutically acceptable salts can be administered at dosages adjusted to individual requirements and fitted to the pharmaceutical exigencies of the situation. Convenient pharmaceutical dosages are in the range of from about 2 mg. to about 200 mg. per day.

The useful anticonvulsant activity of the compounds of formula I above is shown in warm blooded animals utilizing the standard antimetrazole test. This test was carried out according to the method of Everett and Richard (*J.P.E.T.*, 81: 402, 1944). The $ED_{50}$ was calculated as the dose which would prevent convulsions in 50% of the mice tested after administration of 125 mg/kg of pentylenetetrazole by the subcutaneous route. Following these test procedures 11b-(2-chlorophenyl)-10-hydroxyamino-7-methoxymethyl-2,3,5,11b-tetrahydrooxazolo-[3,2-d][1,4]benzodiazepin-6 (7H)-one (Compound A) shows an $ED_{50}$ of $3.1 \pm .3$ mg/kg, indicating that this compound exhibits anti-convulsant activity.

The sedative and muscle relaxant activity of the compounds of formula I above are shown using the standard foot shock test. In this test a pair of mice is confined under a 1 liter beaker placed on a grid which presents shock to the feet. At least five fighting episodes are elicited in a two minute period. Pairs of mice are marked and pretreated 1 hour prior to a second shock. Logarithmic does intervals are utilized up to a maximum of 100 mg/kg. At the 100% blocking dose, three out of three pairs must be blocked from fighting. The measurements are made at the dose level at which 100 percent blocking is observed and the results are expressed as the dose in mg/kg ($PD_{50}$) which blocks the fighting response for 1-hour. Following these test procedures, compound A exhibited a $PD_{50}$ of 25 mg/kg, indicating that this compound exhibits sedative and muscle-relaxant activity.

The following examples are illustrative of the present invention. All temperatures are given in degrees Centigrade.

EXAMPLE 1
Preparation of
11b-(2-Chlorophenyl)-10-nitro-2,3,5,11b-tetrahydrooxazolo[3,2-d][1,4]-benzodiazepin-6(7H)-one A solution of 5.2 g (0.02 M) of stannic chloride in 60 ml of dry ethylene dichloride under nitrogen was treated with 2.9 g (0.0091 M) of 5-(2-chlorophenyl)-1,3-dihydro-7-nitro-2H-1,4-benzodiazepin-2-one. The reaction was cooled in an ice bath, and 2.6 g (0.06 M) of ethylene oxide in 10 ml of ethylene dichloride was added with stirring over an 8 min period. After 18 hr at room temperature, the solution was made basic with concentrated ammonium hydroxide and filtered. The filtrates were washed with a saturated solution of brine, dried over anhyrous sodium sulfate and evaporated to dryness. The residue was crystallized from a mixture of dichloromethane, methanol and petroleum ether to give the above named product as white rods, melting at 201°-203°.

EXAMPLE 2

Preparation of 11b-(2-chlorophenyl)-7-methoxymethyl-10-nitro-2,3,5,11b-tetrahydrooxazolo[3,2-d][1,4]benzodiazepin-6(7H)-one 1.25 g. (0.011 mol) of potassium t-butoxide was added to a solution of 3.6 g. (0.01 mol) of 11b-(2-chlorophenyl)-10-nitro-2,3,5,11b-tetrahydrooxazolo[3,2-d][1,4]benzodiazepin-6(7H)-one in 50 ml. of dimethylformamide cooled to −20°. After stirring for 5 minutes under nitrogen the mixture was further cooled to −40° when 1 ml. (0.0125 mol) of chlorodimethyl ether was added. The temperature was allowed to reach −20°. Water was added and the precipitated crystals were collected and recrystallized from ethanol to leave product with m.p. 139°-141°.

EXAMPLE 3

Preparation of 11b-(2chlorophenyl)-10-hydroxyamino-7-methoxymethyl-2,3,5,11b-tetrahydrooxazolo[3,2-d][1,4]benzodiazepin-6(7H)-one A mixture of 4 g. (0.01 mol) of 11b-(2-chlorophenyl)-7-methoxymethyl-10-nitro-2,3,5,11b-tetrahydrooxazolo[3,2-d][1,4]benzodiazepin-6(7H)-one, 100 ml. of tetrahydrofuran, 50 ml. of methanol, 13.6 g. of sodium acetate trihydrate and 11.3 g. of stannous chloride dihydrate was stirred under nitrogen for 4 hours. 300 ml. of methylene chloride and 15 ml. of concentrated ammonia were added. The inorganic material was removed by filtration through celite. The filtrate was washed with 1N sodium hydroxide solution, dried and evaporated. The residue was chromatographed over 75 g. of silica gel with ethyl acetate/methylene chloride 1/1. Crystallization of the combined clean fractions from ether yielded product with m.p. 160°-162° dec.

EXAMPLE 4

Capsule Formulation

|  | Per Capsule |
| --- | --- |
| 11b-(2-chlorophenyl)-10-hydroxyamino-7-methoxymethyl-2,3,5,11b-tetrahydrooxazolo[3,2-d][1,4]benzodiazepin-6(7H)-one | 50 mg |
| Lactose, USP | 125 mg |
| Corn Starch, USP | 30 mg |
| Talc, USP | 5 mg |
| Total Weight | 210 mg |

Procedure
1. The drug was mixed with lactose and corn starch in a suitable mixer.
2. The mixture was further blended by passing through a Fitzpatrick Comminuting machine with a No. 1A screen with knives forward.
3. The blended powder was returned to the mixer, the talc added and blended thoroughly.
4. The mixture was filled into No. 4 hard shell gelatin capsules on a Parke Davis capsulating machine.

EXAMPLE 5

Capsule Formulation

|  | Per Capsule |
| --- | --- |
| 11b-(2-chlorophenyl)-10-hydroxyamino-7-methoxymethyl-2,3,5,11b-tetrahydrooxazolo[3,2-d][1,4]benzodiazepin-6(7H)-one | 10 mg |
| Lactose | 158 mg |
| Corn Starch | 37 mg |
| Talc | 5 mg |
| Total Weight | 210 mg |

Procedure
1. The drug was mixed with the lactose and corn starch in a suitable mixer.
2. The mixer was further blended by passing through a Fitzpatrick Comminuting machine with a No. 1A screen with knives forward.
3. The blended powder was returned to the mixer, the talc added and blended thoroughly. The mixture was then filled into No. 4 hard shell gelatin capsules on a Parke Davis capsulating machine. (Any similar type machine may be used).

EXAMPLE 6

Tablet Formulation

|  | Per Tablet |
| --- | --- |
| 11b-(2-chlorophenyl)-10-hydroxyamino-7-methoxymethyl-2,3,5,11b-tetrahydrooxazolo[3,2-d][1,4]benzodiazepin-6(7H)-one | 25.00 mg |
| Lactose, USP | 64.50 mg |
| Corn Starch | 10.00 mg |
| Magnesium Sterate | 0.50 mg |
| Total Weight | 100.00 mg |

Procedure
1. The drug was mixed with the lactose, corn starch and magnesium stearate in a suitable mixer.
2. The mixture was further blended by passing through a Fitzpatrick Comminuting machine fitted with a No. 1A screen with knives forward.
3. The mixed powders were slugged on a tablet compressing machine.
4. The slugs were comminuted to a mesh size (16 screen) and mixed well.
5. The tablets were compressed at a tablet weight of 100 mg using tablet punches having a diameter of approximately ¼ inch. (Tablets may be either flat or biconvex and may be scored if desired).

EXAMPLE 7

Tablet Formulation

|  | Per Tablet |
|---|---|
| 11b-(2-chlorophenyl)-10-hydroxyamino-7-methoxymethyl-2,3,5,11b-tetrahydrooxazolo[3,2-d][1,4]benzodiazepin-6(7H)-one | 10.0 mg |
| Lactose | 113.5 mg |
| Corn Starch | 70.5 mg |
| Pregelatinized Corn Starch | 8.0 mg |
| Calcium Stearate | 3.0 mg |
| Total Weight | 205.0 mg |

Procedure
1. The drug was mixed with the lactose, corn starch and pregelatinized corn starch in a suitable size mixture.
2. The mix was passed through a Fitzpatrick Comminuting machine fitted with No. 1A screen and with knives forward.
3. The mix was returned to the mixer and moistened with water to a thick paste. The moist mass was passed through a No. 12 screen and the moist granules were dried on paper lined trays at 110°F.
4. The dried granules were returned to the mixer, the calcium stearate was added, and mixed well.
5. The granules were compressed at a tablet weight of 200 mg using standard concave punches having a diameter of 5/16 inch.

We claim:
1. A compound of the formula

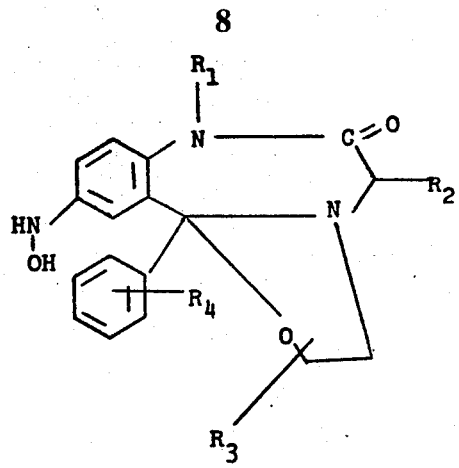

wherein
$R_1$ signifies hydrogen, lower alkyl, $C_4$-$C_{10}$ cycloalkyl-lower alkyl, lower alkoxy-lower alkyl, hydroxy-lower alkyl, or di-lower alkylamino-lower alkyl;
$R_2$ signifies hydrogen or lower alkyl,
$R_3$ signifies hydrogen or lower alkyl;
$R_4$ signifies hydrogen or halogen
and the pharmaceutically acceptable acid addition salts thereof.

2. The compound of claim 1 of the formula 11b-(2-chlorophenyl)-10-hydroxyamino-7-methoxymethyl-2,3,5,11b-tetrahydrooxazolo[3,2-d][1,4]benzodiazepin-6(7H)-one.

* * * * *